March 22, 1966     H. G. KRAUT     3,241,412
METHOD FOR CUTTING SHEET MATERIALS
Original Filed June 21, 1962     5 Sheets-Sheet 1
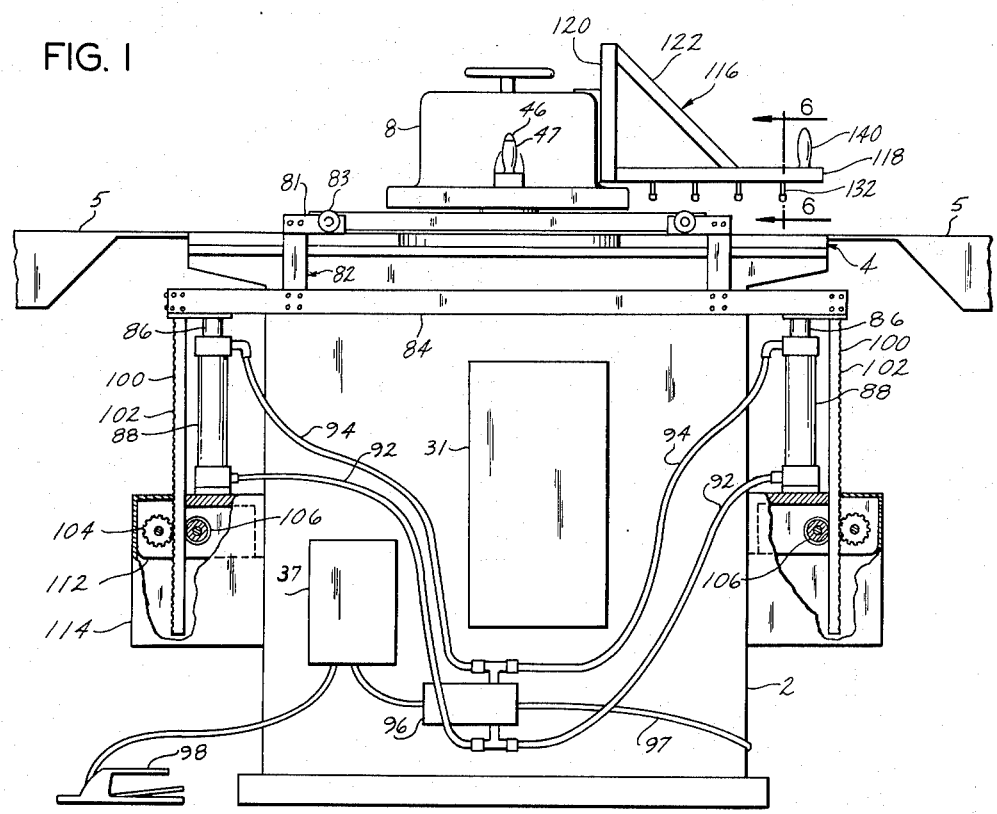
INVENTOR.
HERMAN G. KRAUT
BY
ATTORNEY

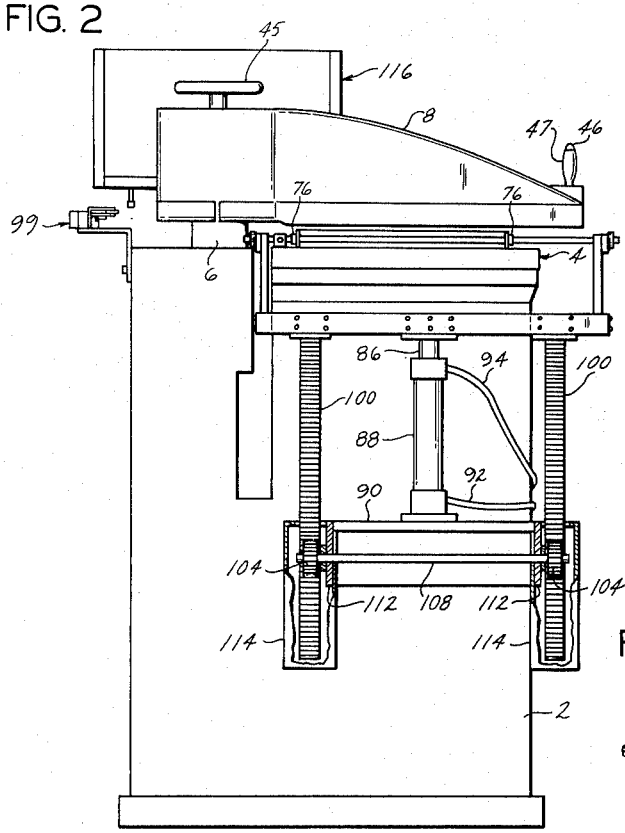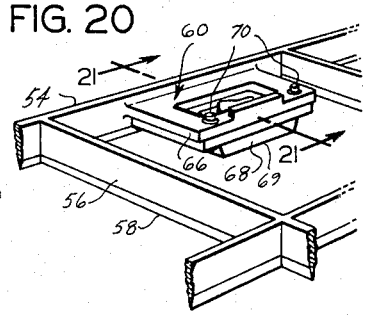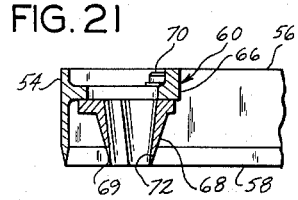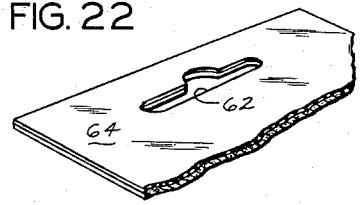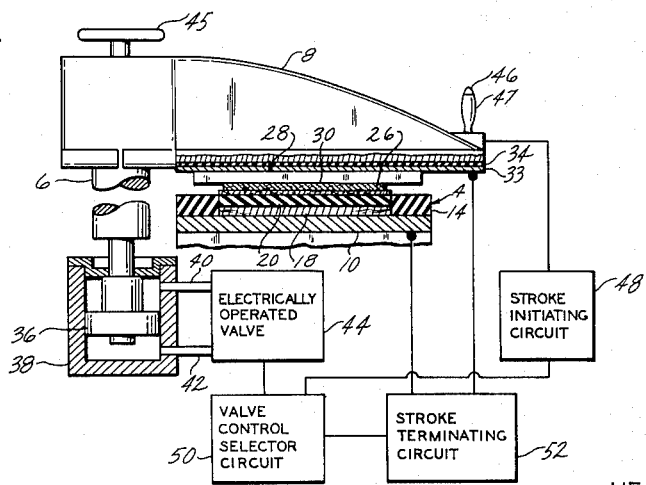

March 22, 1966 H. G. KRAUT 3,241,412
METHOD FOR CUTTING SHEET MATERIALS
Original Filed June 21, 1962 5 Sheets-Sheet 3
FIG. 5
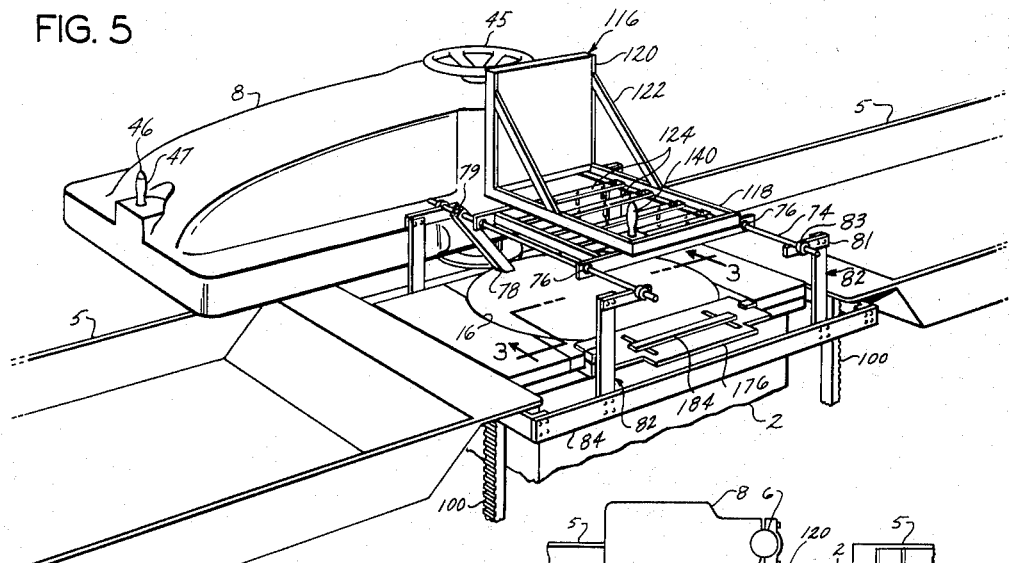
FIG. 7
FIG. 10
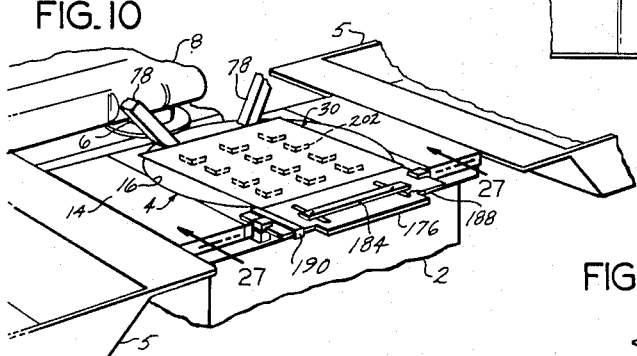
FIG. 8
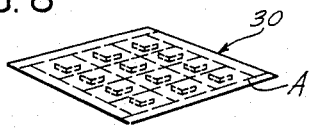
FIG. 11
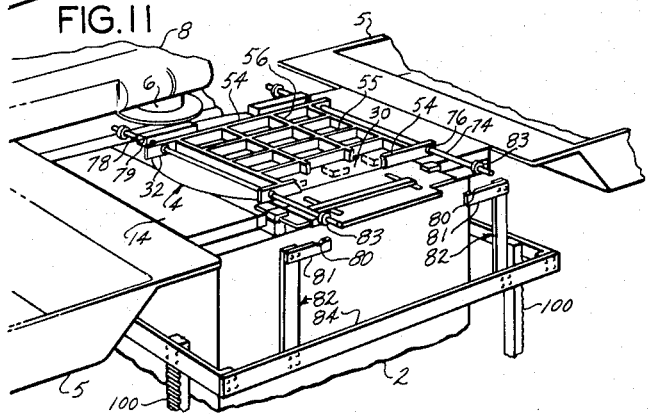
FIG. 9
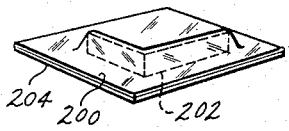
INVENTOR.
HERMAN G. KRAUT
BY
ATTORNEY March 22, 1966     H. G. KRAUT     3,241,412
METHOD FOR CUTTING SHEET MATERIALS
Original Filed June 12, 1962     5 Sheets-Sheet 4
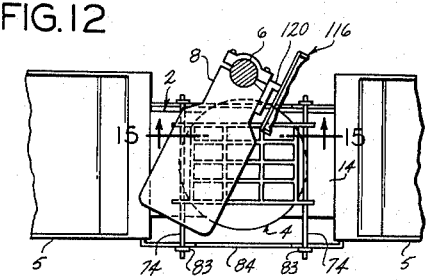
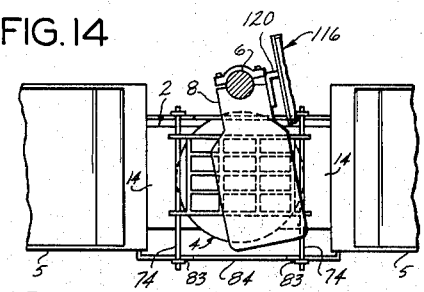
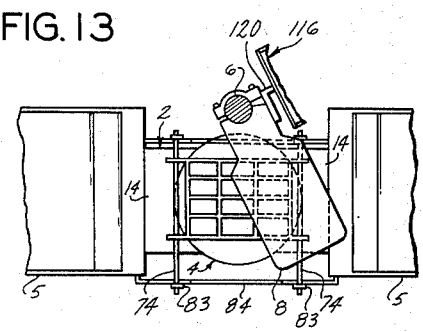
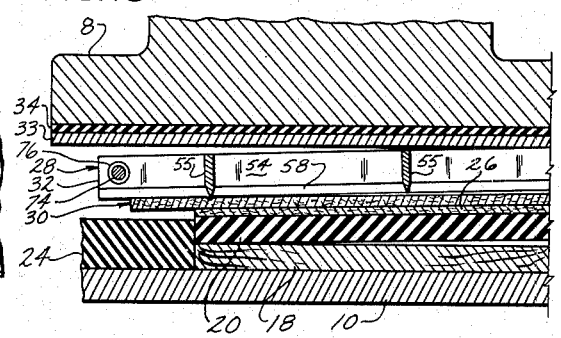
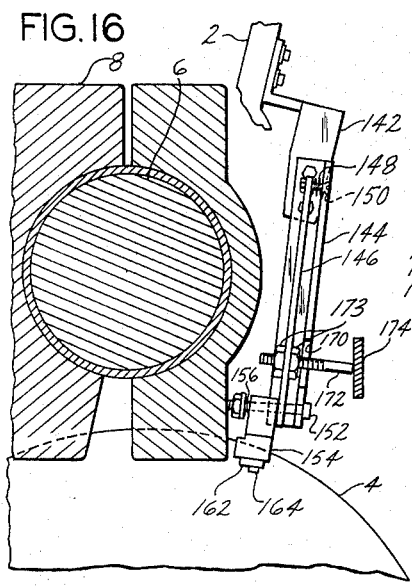
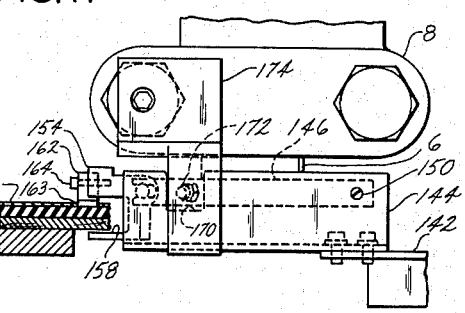
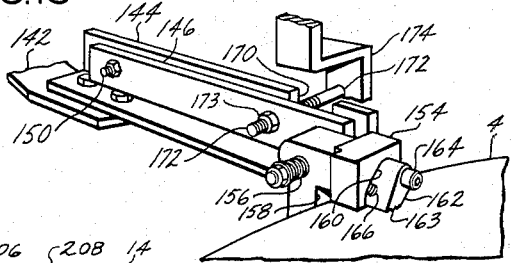
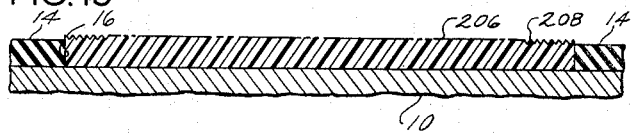
INVENTOR.
HERMAN G. KRAUT
BY
ATTORNEY March 22, 1966  H. G. KRAUT  3,241,412
METHOD FOR CUTTING SHEET MATERIALS
Original Filed June 21, 1962                                5 Sheets-Sheet 5

INVENTOR.
HERMAN G. KRAUT
BY
ATTORNEY

United States Patent Office 3,241,412
Patented Mar. 22, 1966

3,241,412
METHOD FOR CUTTING SHEET MATERIALS
Herman G. Kraut, New Britain, Conn., assignor to The Stanley Works, New Britain, Conn., a corporation of Connecticut
Original application June 21, 1962, Ser. No. 204,195, now Patent No. 3,178,976, dated Apr. 20, 1965. Divided and this application Aug. 21, 1964, Ser. No. 391,186
7 Claims. (Cl. 83—49)

The present invention relates to improvements in cutting presses and more particularly to an improved method for cutting sheet materials utilizing a highly effective cutter die and work-support assembly.

This application is divided from my copending United States application, Serial Number 204,195 filed June 21, 1962, issued as United States Letters Patent No. 3,178,-976 on April 20, 1965.

In the type of cutting apparatus known as a clicker press, a beam or platen mounted upon a spindle or shaft is reciprocated relative to a work support or bed upon which the material to be cut is placed, and, during its downward stroke, the beam supplies force to a cutting die to drive it through the sheet material and against the work support. More recently, the clicker press has been improved by utilization of conductive platen and work-support members and a control mechanism which will terminate the stroke of the platen member when electrical contact is completed between the platen and work-support members. In such improved clicker presses, the work support generally has included a conductive top element fabricated from material such as conductive rubber or conductive synthetic resins and upon which the workpiece is disposed. Apparatus of this type is illustrated and described in Seabury et al. United States Patent No. 2,788,070, granted April 9, 1957, and Bradley United States Patent No. 2,862,154, granted November 25, 1958.

Although such electrically controlled clicker presses are extremely effective and widely utilized, they require frequent replacement or dressing of the conductive bed top portion due to wear by the cutting die and also have been less effective in cutting readily compressible sheet material exerting relatively little resistance to the cutting die such as paperboard, plastic, and the like.

It is an aim of the present invention to provide an improved method for rapidly and efficiently cutting readily compressible sheet material such as paperboard, plastic and the like.

Another aim is to provide such a method wherein there is utilized an improved, long-lasting support assembly for the workpiece against which the cutter die operates.

Still another aim is to provide such a method wherein a cutter die is speedily and properly oriented in desired position upon a workpiece and which enables speedy visual confirmation of proper alignment by the operator.

Other aims and advantages will be readily apparent from the following detailed specification and attached drawings wherein:

FIGURE 1 is a front elevational view of a clicker press embodying the present invention with portions of the gear housings broken away to reveal internal construction;

FIGURE 2 is a side elevational view of the press of FIGURE 1 with portions of the gear housings broken away to reveal internal construction;

FIGURE 3 is a fragmentary front sectional view through the work-support table of the press along the line 3—3 of FIGURE 5;

FIGURE 4 is a diagrammatic illustration of the operating mechanism for controlling the stroke of the platen;

FIGURE 5 is a fragmentary perspective view of the press with the platen pivoted into inoperative position;

FIGURE 6 is a sectional view of the ejector mechanism along the line 6—6 of FIGURE 1;

FIGURE 7 is a fragmentary plan view of the cutter press in the position of FIGURE 5;

FIGURE 8 is a perspective view of a workpiece to be cut into a plurality of sections;

FIGURE 9 is a perspective view of a section cut from the workpiece of FIGURE 8;

FIGURE 10 is a fragmentary perspective view of the work-support table portion of the cutter press with the workpiece of FIGURE 8 operatively disposed thereon;

FIGURE 11 is a fragmentary perspective view of the work-support table portion similar to FIGURE 10 but with the cutter die in operative position upon the workpiece and support table;

FIGURE 12 is a fragmentary plan view of the press with the platen in position for a first stroke;

FIGURE 13 is a view similar to FIGURE 12 with the platen in position for a second stroke;

FIGURE 14 is a view similar to FIGURES 12 and 13 with the platen in position for a third stroke;

FIGURE 15 is a fragmentary sectional view along the line 15—15 of FIGURE 12;

FIGURE 16 is a fragmentary sectional view of the press illustrating the dial-indexing mechanism;

FIGURE 17 is a fragmentary side elevational view illustrating the dial-indexing mechanism;

FIGURE 18 is a fragmentary perspective view of the indexing mechanism;

FIGURE 19 is a fragmentary cross section of a work-support table employing an alternative embodiment of indexing dial;

FIGURE 20 is a fragmentary perspective view of a cutter die;

FIGURE 21 is a fragmentary section of the cutter die along the line 21—21 of FIGURE 20;

FIGURE 22 is a perspective view of a workpiece unit cut by the cutter die of FIGURES 20 and 21;

Figure 23:
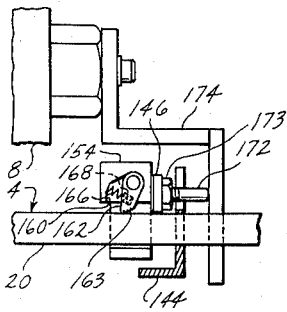
FIGURE 23 is a front elevational view of the dial-indexing mechanism during indexing movement.

It has now been found that the foregoing and related objects can be readily attained by a method in which the workpiece of compressible sheet material is supported upon a rotatable element of non-conductive, semi-rigid but yieldable material which has its upper surface spaced slightly above the plane of the surrounding surfaces of the work support table in which it is rotatably mounted and in which a cutter die properly aligned upon the workpiece and having portions thereof extending beyond the periphery of the rotatable member is driven downwardly by a reciprocable platen which has its major axis offset in one direction from the diameter of the rotatable element and then offset in the other direction. After the workpiece has been cut, the cutter die is raised from the work-support table, the cut pieces discharged therefrom and the rotatable element rotated about its axis to present a different surface for cooperation with the cutter die in the next operating sequence. In operation, the platen makes a plurality of strokes upon the cutter die with the center of its beam secantly disposed relative to the diameter of the rotatable member so as to ensure clean, effective shearing of the compressible sheet material of the workpiece as will be pointed out more in detail hereinafter.

In the preferred embodiment, the apparatus and operating method utilize an electrical circuit to control the stroke of the platen wherein the elevated rotatable member upon which the work is supported is non-conductive, and the surrounding work table surface is conductive. The stroke is terminated by the impingement of the laterally projecting portions of the cutter die upon the conductive work table surface.

Referring in detail to the attached drawings, an electrically controlled clicker press of the type described in the aforementioned United States Patent No. 2,788,070 generally includes a frame 2 having a work support table or bed 4, a vertical spindle or shaft 6 and a beam or platen 8 oscillatably mounted on the spindle 6 for swinging movement from the position shown in FIGURES 5 and 7 to the several positions shown in FIGURES 1 and 12–14 wherein it is in operative position overlying the support table 4 for reciprocation towards and away from the support table 4. In the drawings, the apparatus is shown with fragmentarily illustrated chutes 5 at its sides for receiving the workpieces.

As best seen in FIGURE 3, the work table or bed 4 has a metal plate 10 and a conductive facing member 14 formed of a conductive relatively hard material such as conductive rubber or synthetic plastic. The facing member 14 has a generally circular aperture 16 therethrough in which are rotatably seated the cooperatively configured and dimensioned circular backup piece 18 of wood or other suitable relatively rigid material and the relatively rigid but yieldable non-conductive work-support pad member or dial 20. The upper surface of the work support pad 20 is spaced slightly above the plane of the upper surface of the conductive facing member 14 of the bed 4. To enable facile replacement of the areas subjected to wear, the facing member 14 desirably utilizes four insert pieces 24 spaced about the generally circular aperture 16 at the front and rear portions thereof.

In the embodiment of FIGURE 3, the relatively rigid but yieldable work support pad member 20 is fabricated from a synthetic resin such as nylon and is provided with a top covering 26 of impregnated creped paper tape such as masking tape. In this embodiment, the pad member 20 is also convexly curved or crowned either by molding or by lacerating the upper surface of a rubber pad member so that the tension in the stressed lower surface will draw the pad member into the convex or crowned configuration.

In operation of the press, the downward stroke of the platen 8 drives the cutter die 28 through a workpiece 30 and into the surface of the work support pad member 20 until the laterally projecting operator portions 32 of the cutter die 28 strike the insert pieces 24 of the conductive facing member 14. The press employs an electrical control system of the type described in the aforementioned Seabury Patent No. 2,788,070, and Bradley Patent No. 2,862,154, wherein completion of an electrical circuit between the conductive facing member 14 and the metal face plate 33 which is insulated from the body of the platen 8 by the insulating layer 34 through the cutter die 28 causes the power means driving the platen 8 to terminate the downward stroke and commence its upward stroke. The electrical control system is conveniently enclosed in the housing 31 on the front of the frame 2.

More particularly, the power means for driving the platen 8 is preferably hydraulic, as illustrated diagrammatically in FIGURE 4 wherein the lower end of the spindle 6 has a piston 36 which reciprocates within the hydraulic cylinder 38, fluid being supplied through the upper port 40 and exhausted through the lower port 42 by an electrically operated valve mechanism 44 for the downward stroke and vice-versa for the upward stroke. The length of the stroke may be adjusted by the raising or lowering of the beam or platen 8 relative to the bed 4 by means of the adjusting wheel 45. Upon actuation of the button switch 46 on the operating handle 47 on the platen 8 by the operator, the output of the stroke-initiating circuit 48 is channeled through the valve control selector circuit 50 to cause the valve mechanism 44 to supply fluid to the port 40 and drive the piston 36 and thereby the platen 8 downwardly. Upon electrical contact between the metal faceplate 33 of the platen 8 and the conductive facing member 14 through the impingement of the projecting operator portions 32 of the cutter die upon the insert pieces 24 of the facing member 14, the resultant impulse produced by the stroke terminating circuit 52 is received by the valve control selector circuit 50 which causes the valve to terminate the flow of fluid to the port 40 and to supply fluid to the port 42 to drive the piston 36 and thereby the platen 8 upwardly. As will be readily appreciated, variable delay means may be included in the stroke-terminating circuit 52 or the valve control selector circuit 50 to permit limited additional downward movement of the platen 8 after initial electrical contact and thereby the cutter die 28 before the valve mechanism 44 reverses the action of the piston 36. Full details on suitable circuits may be found in the aforementioned patents.

As best seen in FIGURES 11 and 15, the cutter die 28 is a grid-like structure formed of a plurality of metal bars including the elongated end blades 54 at the front and rear, the intermediate blades 55 parallel thereto, and the side blades 56 extending perpendicularly thereto, each having a bevelled knife-edge 58 extending along the bottom thereof. The end blades 56 at the front and rear of the cutter die 28 are elongated to provide the operator portions 32 which project from the body of the die and strike the insert pieces 24 of the conductive facing member 14. The configuration and dimensioning of the cutter die 28 will, of course, be determined by the nature and dimension of the design to be cut in the workpiece.

In FIGURES 20 and 21, the cutter die 28 is provided with a perforator element 60 secured on the rear bar 54 of the grid for forming the irregularly shaped cut-out 62 in each workpiece unit 64. The perforator element 60 is comprised of a support arm 66 welded or otherwise secured to the cutter die bar 54 and the perforator die 68 which is secured to the support arm 66 by bolts 70. As best seen in FIGURE 21, the perforator die 68 has a bevelled knife-like bottom edge 69 configured to cut the desired cut-out 62 and which is aligned with the knife edges 58 of the blades of the cutter die, and an aperture 72 extends upwardly therethrough and through the support arm 66 for passage upwardly of the pieces cut out from the workpiece.

As best seen in FIGURES 5 and 11, a pair of support rods 74 extend forwardly and rearwardly of the cutter die 28 and bed 4 through apertures in the projecting operator portions 32 of the front and rear cutter blades 54 and are locked in position by collars 76 provided with set screws (not shown). A pair of work-stop bars 78 are mounted on the rods 74 rearwardly of the cutter die 28, and are limited from lateral displacement on the rods by set screws 79. Since the rods 74 may freely rotate in the apertures of the cutter bars 56, the weight of the bars 78 will rotate the rods so that their free end portions contact the bed 4 when the die is elevated; and, as the cutter die 28 is lowered, the rods 74 will rotate so that the bars 78 will lie flat when the cutter die 28 is seated on the bed 4. As best shown in FIGURE 10, the forward faces of the bars 78 provide stops for the rear edge of the workpiece 30 to ensure proper alignment with the cutting die 28.

To enable facile operation of the apparatus, the cutter die 28 is raised and lowered by an elevator or lifter mechanism which also ensures proper alignment of the cutter die relative to the work-support pad member 20 and conductive insert pieces 24. As best seen in FIGURES 2, 5 and 11, the end portions of the cutter die support rods 74 seat in notches 80 formed in the upper edges of the horizontally extending arm portions 81 of the lifter support brackets 82, and the arm portions 81 are preferably provided with an insulating coating of resin such as a plastisol for a purpose to be described hereinafter. Collars 83 fastened on the support rods 74 by set screws (not shown) abut against the outer surfaces of the arms 81 to prevent displacement of the cutter die 28 in the support brackets 82 and thereby to ensure proper alignment of the cutter die 28 relative to the work support pad member 20.

The lower ends of the support brackets 82 are secured to a rectangular lifter frame 84 which extends about the machine frame 2 and is raised and lowered by the pistons 86 of the air cylinder motors 88 which are mounted on the angle brackets 90 on the sides of the frame 2. Air is supplied to the two sides of the pistons 86 in the motors 88 by hoses 92 and hoses 94 which are connected to the electrically operated valve 96. The valve 96 is automatically controlled by the switching mechanism in the switch housing 37 and receives air from a compressor (not shown) through the air supply hose 97.

The operator lowers the frame by pressing the foot switch 98 which actuates the valve 96 through the electrical control system in the housing 37 to feed air through the hoses 94 to the motors 88 and exhaust air through the hoses 92. Although the foot switch 98 and control system may be double-acting to raise the frame after the beam has been swung into the inoperative position shown in FIGURE 5 by pressing of the switch by the operator, an automatic switching mechanism generally designated by the numeral 99 in FIGURE 2 is mounted on the frame and is activated upon pivoting of the beam into inoperative position to cause the valve 96 to supply air to the motors 88 through the hoses 92 and exhaust air through the hoses 94.

Figure 25:
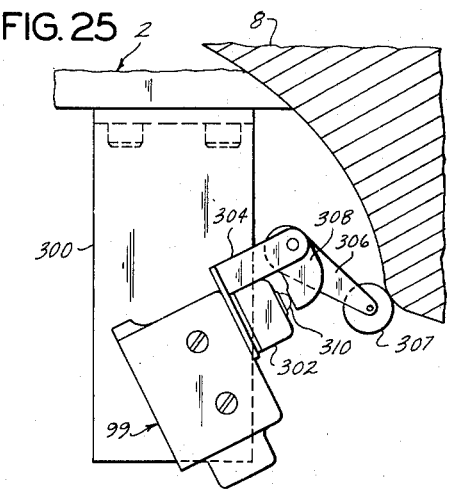
FIGURE 25 is a fragmentary section through the platen illustrating the automatic switch control for the cutter die elevator mechanism.

Referring to FIGURE 25, the automatic switch generally designated by the numeral 99 for raising the cutter die 28 is illustrated in greater detail. The support bracket 300 is mounted on the rear of the frame 2 and supports the housing 302 of the limit switch 99 with its lateral extension 304 upon which is pivotally mounted the follower arm 306 which is biased by a spring (not shown) biasing the switch plunger rod 310 outwardly of the housing. As the platen 8 is pivoted clockwise into its inoperative position, the roller 307 on the free end of the follower arm 306 rides along the arcuate side surface of the platen 8 and is moved towards the switch housing 302, simultaneously moving the switch lever 308 with which it is adjustably connected against the spring on the plunger 310. As the beam 8 swings into its at-rest or inoperative position, the switch lever 308 presses the actuating plunger inwardly sufficiently to actuate the switch and send an electrical impulse to the electrical control system for the valve 96 which reverses the flow of air to the motors 88 and automatically raises the cutter die 28. When the beam or platen 8 is again swung counterclockwise into operative position, the cam-follower arm 306 and switch lever 308 will be biased outwardly of the switch housing 302 and the switch will be deactivated.

Figure 26:
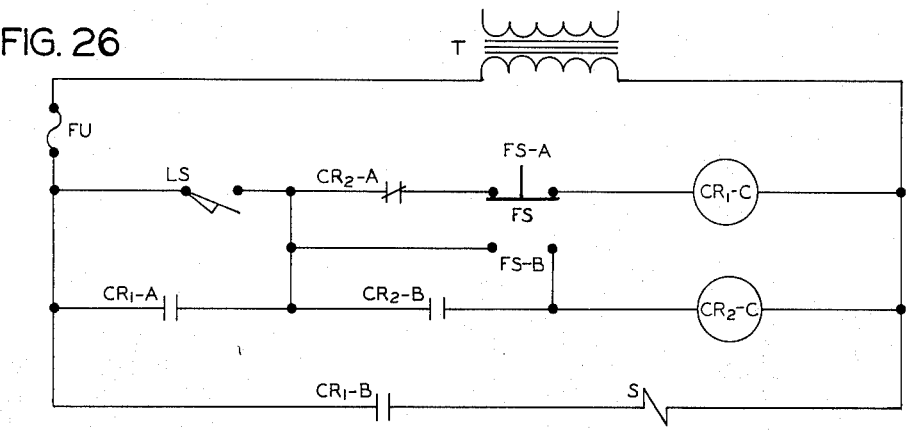
FIGURE 26 is a diagrammatic representation of the wiring and control system for the cutter die elevator mechanism.
Figure 27:
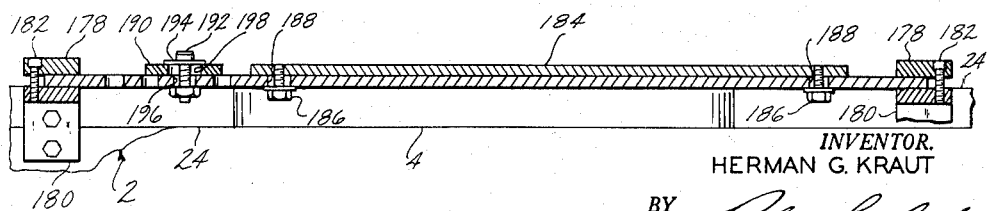
FIGURE 27 is a sectional view along the line 27—27 of FIGURE 10.

In FIGURE 26, a circuit diagram for the electrical system controlling the valve 96 is illustrated. In the inoperative position of the platen 8 wherein it is swung away from the bed 4, the limit switch LS of the switch 99 is closed. Electric current supplied by the transformer T is sent through the normally closed contacts $CR_2-A$ of relay $CR_2$ and the normally closed contacts FS-A of the foot switch FS to energize the relay coil $CR_1-C$ of relay $CR_1$. With the coil of relay $CR_1$ energized, it is held energized by its own normally open contacts $CR_1-A$ for any vibrations or small movements of the platen 8. Another set of normally open contacts $CR_1-B$ on relay $CR_1$ energizes the solenoid coil S of valve 96 to direct the flow of air to the air motors 88 through the hoses 92 to raise the cutting die 28.

When the foot switch 98 is depressed to close the contacts FS-B, the coil $CR_1-C$ of relay $CR_1$ is deenergized and the coil $CR_2-C$ of relay $CR_2$ is energized through the limit switch LS. Relay $CR_2$ holds itself energized so long as the limit switch LS is kept closed through its own normally open holding contacts $CR_2-B$. Through the normally closed contacts $CR_2-A$, coil $CR_1-C$ of relay $CR_1$ is deenergized. Thus, the solenoid S of valve 96 is deenergized through normally open contacts $CR_1-B$ on relay $CR_1$. This directs the flow of air through the hoses 94 to cause the air motors 88 to pull the cutting die 28 down to the bed 4.

When the beam 8 is swung into operative position, the limit switch LS is opened. When the beam 8 is subsequently swung back into its inoperative position, the limit switch LS is again closed to automatically return the cutting die 28 to its raised position provided that the foot switch FS is not at that time depressed. The cutting die 28 can only be brought down onto the table if the beam 8 is in its inoperative position.

The raising and lowering of the frame by the air motors 88 is stabilized by a pair of rack and pinion units on each side of the frame 84 spaced to opposite sides of the air motors 88. As best seen in FIGURES 1 and 2, the elongate gear bars or racks 100 are secured at the upper ends to the lifter frame 84 and are provided with gear teeth 102 in their outer faces which mesh with the teeth of the pinion gears 104 and are held in firm contact therewith by the bearings 106. The shaft 108 upon which the pinion gears 104 are mounted synchronizes their rotation to ensure aligned movement of the lifter frame 84. Both the shaft 108 and the individual shafts (not shown) for the bearings 106 are mounted in the support plates 112 which are welded to the angle brackets 90. Housings 114 are desirably provided to enclose the gear drive units for safety considerations.

To expedite removal of the severed units 64 of the workpiece 30 which are frictionally retained within the gridwork of the cutter die 28, an ejector unit generally designated by the numeral 116 is mounted upon the platen or beam 8 so that it registers with the die 28 when the beam 8 is swung into inoperative position. As best seen in FIGURES 1, 5 and 6, the ejector unit 116 has a generally U-shaped frame 118 formed of angle iron brackets and is supported parallel to the bed 4 by the anchor unit 120 which is secured to the beam 8. The inner ends of the leg portions of the ejector frame 118 are welded to the anchor unit 120 and braces 122 and provide additional support for the ejector frame outwardly from the support unit 120.

A plurality of ejector bars 124 are slidably mounted on the leg portions of the U-shaped ejector frame 118 by clamps 126 and threaded fasteners 128 so that they may be adjusted in position along the length of the frame for varying sizes of workpiece units 64 and grid openings in the cutter die 28. The bars 124 have elongated slots 130 therein permitting lateral adjustment of the depending ejector fingers 132 which are threadably secured therein by the nuts 134, 136. To prevent damage to the workpiece units, the free ends of the ejector fingers 132 are provided with rubber caps 138. Also mounted on the ejector frame 118 is a handle 140 to facilitate pivoting of the beam 8.

Thus, the desired number of ejector bars 124 may be located within the frame simply by pivoting of the loosened clamps 126 about the fasteners 128, and they may be readily oriented along the length of the frame. Similarly, the desired number of ejector fingers 132 can be speedily assembled to the several bars 124 by the nuts 134 and oriented transversely of the frame to correspond with the several openings within the gridwork of the cutter die 28.

As the lifter frame 84 is raising the cutter die 28 after the beam 8 has been swung into inoperative position, the depending ejector fingers 132 push the severed workpiece units 64 out of the boxes of the cutter die so that they may be quickly and easily pushed into the chutes 5 for further processing.

As illustrated in FIGURES 16–18 and 23–24, the apparatus of the present invention also employs a mechanism for rotating or indexing the work-support pad member or dial 20 about its axis to prevent excessive wear at any location on its surface, which mechanism is responsive only to completion of a cutting cycle. A support arm 142 is secured to the frame 2 and has bolted thereto an elongated L-shaped stationary guide 144 having its vertically extending leg oriented away from the beam 8. Carried by the guide 144 is a release bar 146 which has its outer end biased away from the vertical leg of the stationary guide 144 by the interposed spring 148 which utilizes as a spring guide the threaded fastener 150 holding the outer end of the guide 144 and bar 146 together. At the other or inner end, the release bar 146 and guide 144 are held together by the threaded fastener 152 which also secures the pawl holder 154 to the end of the release bar 146. The spring 156 on the end of the fastener 152 biases the inner end of the release bar 146 against the vertically extending leg of the guide 144.

Figure 24:
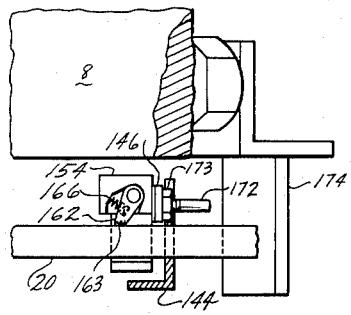
FIGURE 24 is a front elevational view similar to FIGURE 23 showing the dial-indexing mechanism during recovery.

As best seen in FIGURE 17, the pawl holder 154 has a transverse slot 158 in its inner face in which is received the edge portion of the pad member 20 for rotation therein. As best seen in FIGURES 23–24, the pawl holder 154 also has a recess 160 in its inner face above the slot 158 in which is received the pawl 162 which has a serrated lower edge 163 engaging the upper surface of the pad member or dial 20. The recess 160 is of greater dimension than the pawl 162 to permit some pivotal movement of the pawl therein about the fastener 164 which pivotally mounts its upper end to the pawl holder 154 and is configured so that the spring 166, which is seated in a bore 168 in the pawl and acts against the side wall of the recess 160, biases the pawl in a counterclockwise direction within the recess 160 to a position wherein the leading (or left-hand) portion of its bottom edge is slightly lower than the trailing (or right-hand) portion.

The release stud 172 is mounted on the release bar 146 between fasteners 150, 152 and adjacent the inner end of the release bar 146 and projects horizontally outwardly through the notch 170 in the vertical leg of the stationary guide 144. The release lever 174 mounted on the beam or platen 8 engages the outer end of the release stud 172 as the platen 8 is swung into inoperative position and thereby pivots the release bar 146 in a clockwise direction, the inner end moving away from the vertical leg of the stationary guide 144 and the outer end moving towards the vertical leg, both movements taking place in opposition to the biasing pressure of the springs 156 and 148, respectively.

As best seen in FIGURES 23 and 24, when the inner end of the release bar 146 is moved in a clockwise direction, the pawl 162 which has the leading portion of its serrated lower edge 163 in engagement with the top surface of the work-support pad member or dial 20 moves the pad member 20 in a counterclockwise direction about its own axis (to the left of the drawing). As the beam 8 is swung back into operative position over the bed 4, the release lever 174 disengages from the release stud 172 and the springs 148 and 156 return the release bar 146 to its initial position, the inner end of the bar 146 pivoting in a counterclockwise direction. During this return movement of the inner end of the release bar 146, the canted pawl 162 is dragged over the surface of the dial 20 against the biasing pressure of the spring 166 until returned to the initial position. In this manner, it can be seen that the work-support pad member or dial 20 is automatically indexed or rotated only when an operating cycle is completed so that a plurality of strokes of the platen 8 may be made without disturbing the position of the workpiece upon the dial.

As previously pointed out, the work-stop bars 78 on the cutter die 28 provide a stop for properly orienting the back edge of the workpiece 30 relative to the cutter die 28. To provide a stop for orienting the front edge of a workpiece when workpieces of lesser dimension are being processed, a stop plate 176 is adjustably fastened on the front edge of the bed 4 between the clamps 178 and the underlying support brackets 180 which are secured to the bed 4. By loosening the threaded fasteners 182, the stop plate 176 may be moved inwardly or outwardly of the dial 20 to provide an adjustable front guide for the workpiece. However, since the stop plate 176 must remain upon the top surface of the bed 4, an auxiliary stop 184 is slidably mounted upon the stop plate 176 by headed fasteners 186 which are slidable in the elongate slots 188 thereof, thus enabling a front guide spaced outwardly from the dial 20.

To provide a guide or stop for the side of the workpiece, the side plate 190 is secured to the top of the stop plate 176 by the threaded fasteners 192 and large washers 194. To provide a coarse adjustment, the fasteners 192 may be engaged in one of the several laterally spaced pairs of aligned apertures 196 on the stop plate 176. For fine adjustment, the fasteners may be varied in position within the elongated side plate slots 198.

In FIGURES 8 and 9, workpieces of the type for which the present invention has been particularly advantageous are illustrated. Generally, the illustrated workpiece 30 is a skin-packaged card wherein a sheet of thermoplastic film 200 is drawn down and draped about a metallic or other article 202 to provide a close-fitting sheath and is bonded to a paperboard substrate 204 to secure and seal the article 202 therein. In the skin-packaging operation, a plurality of articles are spaced upon a large sheet of paperboard, and the film is drawn into a sheath over the articles and bonded over the entire surface of the large sheet of paperboard in a single sequence of the packaging apparatus to provide a large card such as illustrated in FIGURE 8. The large card of bonded articles is then cut along the dotted line A in FIGURE 8 into the individual workpiece units 64 of FIGURE 9.

In FIGURE 19, an alternative embodiment of a work-support pad member or dial is illustrated and designated by the numeral 206. In this embodiment, the dial 206 is fabricated from a relatively rigid but yieldable synthetic plastic such as nylon and is essentially flat. The entire upper face (or both faces) is provided with serrations 208 which thus provide a multitude of small peaks and valleys to provide non-uniform compression and resistance of the workpiece in combination with the cutter die 28.

Referring now to the method and operation of the apparatus, the beam or platen 8 is in its rearward or inoperative position initially and the operator places the workpiece 30 upon the surface of the work-support pad member or dial 20 with its rear edge butting against the front face of the work-stop bars 78 and its left side edge butting against the side plate 190, as shown in FIGURE 10. The operator then presses the foot switch 98 to lower the cutter die 28 onto the workpiece, as shown in FIGURE 11, and then swings the platen 8 partially forward, thus permitting him to visually check the alignment of the gridwork of the cutter die 28 relative to the intended lines of cut in the workpiece. If adjustment is necessary, this can be readily effected by varying the location of the side plate 190 or utilizing the stop plate 176 or auxiliary stop 184 at the front of the bed as a guide for the front edge of the workpiece.

After proper alignment has been ensured, the platen 8 is swung into a position wherein its major axis is offset from the center of the cutter die 28 and the diameter of the dial 20, i.e., secantly intersects the dial, and a first stroke of the platen 8 effected by the actuation of the switch 46 on the operating handle, the downward stroke being terminated by contact of the operator portions 32 of the cutter die 28 with the insert pieces 24 of the conductive facing member 14. The platen 8 is then swung to the opposite side of the dial 20 into a similarly singularly offset position wherein a second stroke is effected. For workpieces requiring a large amount of cutting, a third or additional stroke with the axis of the platen 8 more closely oriented relative to the diameter of the dial 20 may be necessary or desirable to ensure proper cutting of the workpiece at the center of the dial 20. The orientation of the platen during the several strokes is desirably illustrated in FIGURES 12–14.

The operator then swings the platen 8 back into its inoperative position which operates the switch 99 to actuate the air motors 88 and automatically lift the cutter die 28 from the dial 20. As the cutter die 28 is rising, the ejector fingers 132 of the ejector unit 116, which is positioned thereabove, dislodge the individual workpiece units from the gridwork of the cutter die 28 onto the surface of the table 4 so that they and the trimmings can be brushed into either of the chutes 5.

Although the theory of operation is not fully understood, the raised work-support pad member of the present invention has proven highly effective in cutting readily compressible sheet material such as paperboard and has been particularly advantageous in cutting the skin-packaged cards which are composites of plastic film and paperboard.

In the method of the present invention, the center of the platen 8 is offset relative to the center of the cutter die 28 and the diameter of the work-support pad member 20 during the cutting strokes, and the cutter die end bars 56 project beyond the periphery of the pad member 20 as best seen in FIGURE 15. When the platen 8 presses the cutter die 28 downwardly, it is considered that the workpiece 30 is initially compressed by the knife edges 58 but that during further movement of the platen, some relative rocking motion occurs between the cutter die 28 and platen 8 due to the unsupported projecting operator positions of the cutter die and the angularly offset platen causing the cutter die 28 to initiate shearing of the workpiece adjacent the periphery of the pad member 20 with the lines of cut rapidly spreading therefrom in the previously compressed material of the workpiece.

Although essentially flat pad members have proven effective in the present invention, the arched or crowned pad member 20 shown in FIGURES 3 and 15 provides some improvement in cutting action, apparently due to the initial resilience of the arched center portion and the resistance exerted against the cutter die when the center portion is depressed.

It has been noted that improved cutting action has been obtained with pad members 20 having a scarred surface resulting from the cutting action of the cutter die 28, and it is believed that this improvement results from a multitude of peaks and valleys so that uneven compression of the material of the workpiece will occur to facilitate cutting at the peaks in conjunction with the apparent rocking action produced by the angularly offset platen. Accordingly, creped tape desirably has been utilized for a surface covering as at 26 in FIGURES 3 and 15 to provide such an irregular surface while also minimizing scarring of the underlying material of the body of the pad member 20. In FIGURE 19, an alternative pad member 206 which has serrations 208 formed in its surface may be utilized.

It will be readily apparent that the cutter die 28 must penetrate into the work-support pad member 20 to a limited extent to obtain optimum cutting action, the pad material serving to press the material of the workpiece against the sides of the knife edges 58 of the cutter blades. Accordingly, the pad members are fabricated from a non-conductive material which is relatively rigid to provide a firm support for the workpiece and resistance to the cutter die but yet affording some yieldability to enable limited penetration thereinto of the cutter die. Hard rubber and synthetic plastics such as nylon have proven generally satisfactory for this purpose. It will be readily understood that a surface covering of tape or other material with an interposed adhesive may be utilized to provide or enhance the limited yieldability commensurate with the relative rigidity provided by the base portion of the pad member, and such tape coverings have proven particularly advantageous with harder, less yieldable materials such as nylon.

Since the end blades 56 extend beyond the periphery of the pad member 20, it is considered that shearing readily takes place at the intersection of the periphery and blades since the rocking action appears pronounced. As the platen 8 continues to press the cutter die 28 downwardly, the projecting operator portions 32 of the end blades 56 strike the insert pieces 24 of the conductive facing member 14 to complete an electrical circuit with the metal face plate 33 of the platen 8. Since the pad member 20 is elevated relative to the facing member 14, it can be seen that adequate cutting and rocking action is effected before contact of the operator portions 32 with the conductive facing member 14.

In practice, it has been found that the upper surface of the non-conductive pad member or dial should be spaced about $\frac{1}{32}$ to $\frac{1}{8}$ inch above the surrounding surface of the bed to ensure proper rocking action of the cutter die. A greater distance may prevent contact of the operator portions of the cutter die with the conductive facing of the bed, and it has been desirable to use about $\frac{3}{32}$ inch as a maximum height for harder materials such as nylon. With the crowned pad member, the center of the pad member may be $\frac{1}{16}$ to $\frac{3}{16}$ inch above the surrounding surface of the bed with the peripheral portions spaced as above. If so desired, the height of the dial may be varied by use of paper or other thin sheet material shims placed under the dial or by use of a tape covering on the upper surface.

For cutting some patterns and materials, it may be desirable to accentuate the rocking action by placing small shims under the front edge of the metal plate 10 to elevate the front edge of the dial or to place a shim on the upper edge of the cutter die, generally at or near the center thereof.

In order to prevent premature contact between the platen 8 and the bed 4 in the event of early tilting of the cutter die 28 during the commencement of the cutting stroke, the arm portions 81 of the lifter support brackets 82 are insulated, conveniently by a plastisol coating as hereinbefore described.

It has been found that wax or other lubricants applied to the cutting surfaces of the cutter die will enhance the cutting action and apparently reduce the power required to cut through a given workpiece. Wax or other solid lubricants also may be placed upon the surface of the dial to provide lubricity and also to refinish the surface of the dial to some extent when it becomes heavily scarred by the action of the cutter die. This refinishing of the scarred surface is also accomplished to some extent by wax lubricant on the cutter die and by pulverization of the material of the workpiece.

Thus, it can be seen that the cutting method of the present invention provides a highly desirable cutting action wherein the cutter die effectively shears the workpiece before electrical contact between the platen and conductive bed is effected. The method ensures proper alignment of the cutter die and workpiece relative to the platen and dial and automatically raises and lowers the cutter die to facilitate operation and provides for automatic ejection of the cut pieces from the cutter die after the operating sequence.

The work-support pad which is subjected to wear by the cutter die is indexed after each cycle to prevent excessive wear upon the pad at any one point and thereby extend the usable life thereof most significantly.

It will be readily appreciated that various modifications in the method specifically described herein may be made within the spirit and scope of the present invention.

Having thus described the invention, I claim:

1. The method of cutting workpieces of sheet material comprising providing a work-support table having a work-support pad member thereon having its upper surface spaced slightly above the upper surface of the table surrounding said pad member; placing a workpiece of sheet material on said work-support pad member; placing a cutter die upon said workpiece, said cutter die having a body portion on the workpiece over said pad member defining the pattern to be cut and having portions projecting laterally outwardly of the periphery of the work-support pad member; applying pressure to the top of said cutter die along an axis offset to one side of the centers of said cutter die and pad member to drive said cutter die through said workpiece and into the pad member; removing the pressure from the top of said cutter die; thereafter applying pressure to the top of said cutter die along an axis offset to the other side of the centers of said cutter die and pad member; and removing the pressure from the top of said cutter die.

2. The method of cutting workpieces of sheet material comprising providing a work-support table having a conductive upper surface and a non-conductive work-support pad member thereon having its upper surface spaced slightly above the conductive surface of the table surrounding said pad member; placing a workpiece of sheet material on said work-support pad member; placing a metallic cutter die upon said workpiece, said cutter die having a body portion on the workpiece over said pad member defining the pattern to be cut and having portions projecting laterally outwardly of the periphery of the work-support pad member and spaced upwardly from the conductive upper surface of said work-support table; driving a metallic platen downwardly against the top of said cutter die along an axis offset to one side of the centers of said cutter die and pad member to drive said cutter die through said workpiece and into the pad member and cause said laterally projecting portions of the cutter die to contact the conductive upper surface of said table surrounding said pad member and complete an electrical circuit between said conductive table and metallic platen to actuate control means for terminating the downward movement of the platen; raising said platen from said cutter die; moving said platen to a position wherein its axis is offset to the other side of the centers of said cutter die and pad member; driving said platen downwardly against the top of said cutter die to drive said cutter die through said workpiece and into the pad member and cause said laterally projecting portions of the cutter die to contact the conductive upper surface of said table to actuate control means for terminating the downward movement of the platen; and raising said platen from said cutter die.

3. The method of cutting workpieces of sheet material comprising providing a work-support table having a work-support pad member thereon having its upper surface spaced slightly above the upper surface of the table surrounding said pad member; placing a workpiece of sheet material on said work-support pad member; actuating an elevator mechanism to place a cutter die upon the upper surface of said workpiece in predetermined alignment, said cutter die having a body portion on the workpiece over said pad member defining the pattern to be cut therein and having portions projecting laterally outwardly of the periphery of the work-support pad member; applying pressure to the top of said cutter die along an axis offset to one side of the centers of said cutter die and pad member to drive said cutter die through said workpiece and into the pad member; removing the pressure from the top of said cutter die; thereafter applying pressure along an axis offset to the other side of the centers of said cutter die removing the pressure from the top of said cutter die and pad member; and actuating said elevator mechanism to raise said cutter die from said pad member.

4. The method of cutting workpieces of sheet material comprising providing a work-support table having a work-support pad member thereon having its upper surface spaced slightly above the upper surface of the table surrounding said pad member; placing a workpiece of sheet material on said work-support pad member; actuating an elevator mechanism to place a cutter die upon the upper surface of said workpiece in predetermined alignment, said cutter die having a body portion on the workpiece over said pad member defining the pattern to be cut therein and having portions projecting laterally outwardly of the periphery of the work-support pad member; applying pressure to the top of said cutter die along an axis offset to one side of the centers of said cutter die and pad member to drive said cutter die through said workpiece and into the pad member; removing the pressure from the top of said cutter die; thereafter applying pressure along an axis offset to the other side of the centers of said cutter die and pad member; removing the pressure from the top of said cutter die; actuating said elevator mechanism to raise said cutter die from said pad member, the units severed from said workpiece being frictionally retained within said cutter die; and ejecting the severed units from said cutter die during the raising thereof from said pad member.

5. The method of cutting workpieces of sheet material comprising providing a work-support table having a work-support pad member rotatably mounted thereon, said pad member having its upper surface spaced slightly above the upper surface of the table surrounding said pad member; placing a workpiece of sheet material on said work-support pad member; placing a cutter die upon said workpiece, said cutter die having a body portion on the workpiece over said pad member defining the pattern to be cut and having portions projecting laterally outwardly of the periphery of the work-support pad member; applying pressure to the top of said cutter die along an axis offset to one side of the centers of said cutter die and pad member to drive said cutter die through said workpiece and into the pad member; removing the pressure from the top of said cutter die; thereafter applying pressure along an axis offset to the other side of the centers of said cutter die and pad member; removing the pressure from the top of said cutter die; removing said cutter die from said pad member; and rotating said pad member a slight distance about its axis.

6. The method of cutting workpieces of sheet material comprising providing a work-support table having a circular work-support pad member rotatably mounted thereon, said pad member having its upper surface spaced slightly above the upper surface of the table surrounding said pad member; placing a workpiece of sheet material on said work-support pad member; actuating an elevator mechanism to place a cutter die upon the upper surface of said workpiece in predetermined alignment, said cutter die having a body portion on the workpiece over said pad member defining the pattern to be cut therein and having portions projecting laterally outwardly of the periphery of the work-support pad member; applying pressure to the top of said cutter die along an axis offset to one side of the centers of said cutter die and pad member to drive said cutter die through said workpiece and into the pad member; removing the pressure from the top of said cutter die; thereafter applying pressure along an axis offset to the other side of the centers of said cutter die and pad member; removing the pressure from the top of said cutter die; actuating said elevator mechanism to raise said cutter die from said pad member, the units severed from said workpiece being frictionally retained within said cutter die; ejecting the severed units from said cutter die during the raising thereof from said pad member; and rotating said pad member a slight distance about its axis.

7. The method of cutting workpieces of sheet material comprising providing a work-support table having a conductive upper surface and a circular non-conductive work-support pad member rotatably mounted thereon, said pad member having its upper surface spaced slightly above the conductive surface of the table surrounding said pad member; placing a workpiece of sheet material on said work-support pad member; actuating an elevator mechanism to place a metallic cutter die upon the upper surface of said workpiece in predetermined alignment, said cutter die having a body portion on the workpiece over said pad member defining the pattern to be cut therein and having portions projecting laterally outwardly of the periphery of the work-support pad member; driving a metallic platen downwardly against the top of said cutter die along an axis offset to one side of the centers of said cutter die and pad member to drive said cutter die through said workpiece and into the pad member and cause said laterally projecting portions of the cutter die to contact the conductive upper surface of said table surrounding said pad member and complete an electrical circuit between said conductive table and metallic platen to actuate control means for terminating the downward movement of the platen; raising said platen from said cutter die; moving said platen to a position wherein its axis is offset to the other side of the centers of said cutter die and pad member; driving said platen downwardly against the top of said cutter die to drive said cutter die through said workpiece and into the pad member and cause said laterally projecting portions of the cutter die to contact the conductive upper surface of said table to actuate control means for terminating the downward movement of the platen; raising said platen from said cutter die; actuating said elevator mechanism to raise said cutter die from said pad member, the units severed from said workpiece being frictionally retained within said cutter die; ejecting the severed units from said cutter die during the raising thereof from said pad member; and rotating said pad member a slight distance about its axis.

References Cited by the Examiner

UNITED STATES PATENTS

| | | | |
|---|---|---|---|
| 1,442,180 | 1/1923 | Sherman | 83—541 |
| 1,695,271 | 12/1928 | Caplinger | 101—297 |
| 1,759,476 | 5/1930 | Allen | 101—297 |
| 2,276,480 | 3/1942 | Glidden | 83—535 |
| 2,421,809 | 6/1947 | Seely et al. | 83—535 |
| 2,497,798 | 2/1950 | Root | 101—297 |
| 2,600,165 | 6/1952 | Horgan | 83—527 |
| 2,783,838 | 3/1957 | Ericson et al. | 83—639 |
| 2,818,922 | 1/1958 | Stratton et al. | 83—538 |
| 3,153,965 | 10/1964 | Muhlbach | 83—639 |

FOREIGN PATENTS 235,620  6/1945  Switzerland.

WILLIAM W. DYER, Jr., *Primary Examiner.*

ANDREW R. JUHASZ, *Examiner.*